2 Sheets—Sheet 1.

H. B. MEECH.

Assignor to B. F. BROWN.

Manufacture of Paper-Pulp from Wood.

No. 8,257. Reissued May 28, 1878.

*WITNESSES*

Wm A Skinkle

Roberdeau Buchanan.

*INVENTOR*

Harrison B Meech.

*By his Attorneys*

Baldwin, Hopkins & Peyton

2 Sheets—Sheet 2.

H. B. MEECH.

Assignor to B. F. BROWN.

Manufacture of Paper-Pulp from Wood.

No. 8,257. Reissued May 28, 1878.

*WITNESSES*

Wm A Skinkle

Roberdeau Buchanan.

*INVENTOR*

Harrison B Meech.

*By his Attorneys*

Baldwin Hopkins & Peyton

UNITED STATES PATENT OFFICE.

HARRISON B. MEECH, OF CHATHAM VILLAGE, NEW YORK, ASSIGNOR TO BENJAMIN F. BROWN.

IMPROVEMENT IN THE MANUFACTURE OF PAPER-PULP FROM WOOD.

Specification forming part of Letters Patent No. 106,710, dated August 23, 1870; Reissue No. 8,257, dated May 28, 1878; application filed May 7, 1878.

DIVISION B.

*To all whom it may concern:*

Be it known that I, HARRISON B. MEECH, formerly of Fort Edward, in the county of Washington and State of New York, now residing at Chatham Village, New York, have invented a new and useful Improvement in the Art of Reducing Wood to Pulp; and that the following, taken in connection with the drawings, is a full, clear, and exact description thereof.

Figure 1:
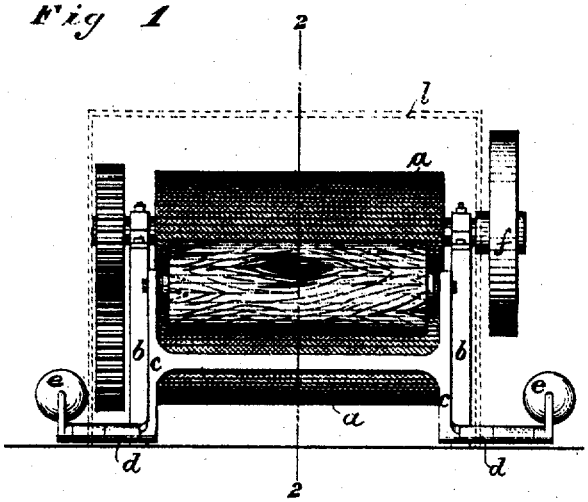
Figure 2:
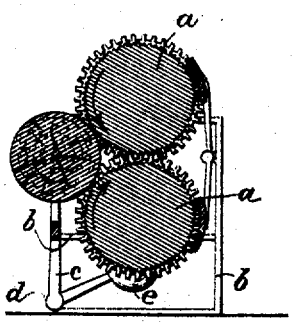
Figure 3:
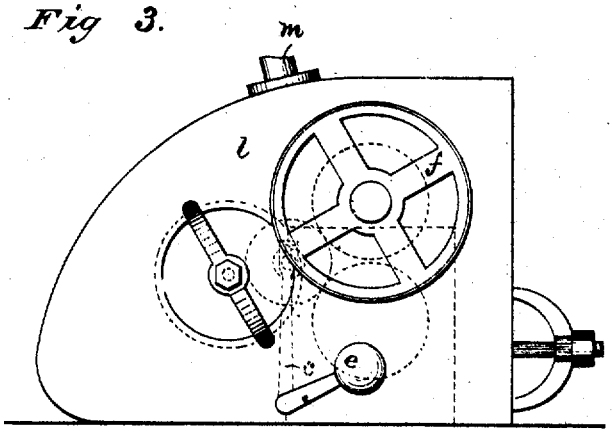
Figure 4:
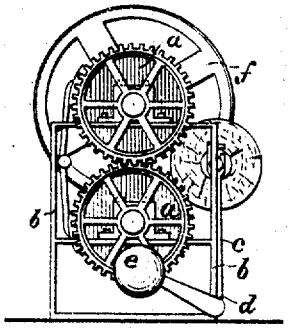
Figure 5:
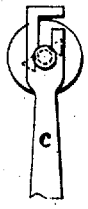
Figure 6:
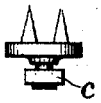
Figure 7:
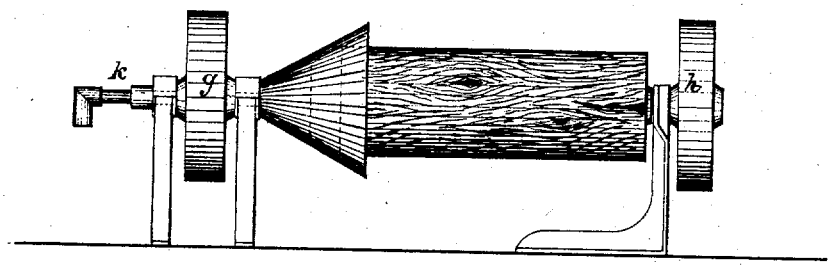

In the drawings, Figure 1 is a front elevation, and Fig. 2 a vertical transverse section therethrough on the line 2 2 of Fig. 1. Fig. 3 is an end elevation of a tight box or vessel in which my machine may be inclosed. Fig. 4 is an elevation of that end of the machine upon which the gearing is mounted. Figs. 5 and 6 are detached views of dogs for supporting the wood. Fig. 7 is a side elevation of, and Fig. 8 a partial section through, another machine, by means of which my process may be carried out.

My improvement in the art or process of reducing wood to pulp consists in subjecting the wood to the action of steam during the operation of grinding the wood, whereby the wood will be softened and ground more easily; and I intend to carry out this process either by inclosing the grinding apparatus in a steam-tight vessel, into which steam is admitted, or by letting on steam between the wood and the grinding-surface when grinding.

The machine shown in Figs. 1, 2, and 3 consists of two iron rollers, *a a*, provided with suitable shafts and mounted on proper journal-boxes in a strong frame, *b b*. The surfaces of these rollers are picked or made rough like a file, so that they are grinding-surfaces. The block or billet of wood to be ground, which I prefer to have about two feet long, has dogs, Figs. 5 and 6, driven into its ends, and these dogs rest (see Fig. 5) in slots in the ends of two bent levers, *c c*, framed together, these levers being free to turn in boxes *d d*, and having weights *e e* applied to their other ends. These weights force the wood against the grinding-surfaces, and the wood may be revolved in either direction. The rollers are geared together, so that they both revolve when power is applied to the pulley *f*.

Figure 8:
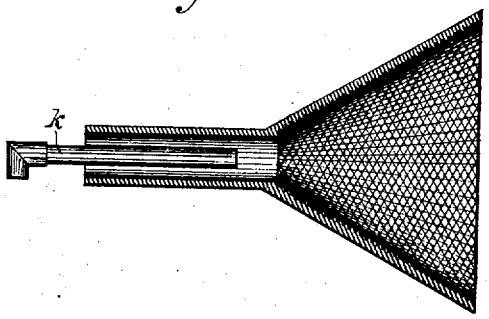

Another machine, by means of which the process may be worked out, is represented in Figs. 7 and 8, and consists of a hollow cone, whose interior is a grinding-surface. This cone is prolonged into a tube, which forms a shaft, by means of which the grinding-surface is supported. This shaft is mounted in proper journal-boxes, and has applied to it a pulley, *g*, by means of which it may be revolved. The log of wood which is to be reduced to fiber is supported at one end in the cone, and at the other end by a dog driven into it and resting in a slot mounted on a carriage, which can be moved toward the conical grinding-surface. This dog has a pulley, *h*, on its shaft.

In the operation of this machine either the log or the grinding-surface, or both, may be revolved.

Steam is to be admitted to the interior of this cone by the pipe *k* while the wood is being ground, thus letting on steam between the log and the grinding-surfaces when grinding. In the two-roller machine steam may be let on between the log and the grinding-surface of the rollers when grinding, or the machine may be inclosed in a steam-tight vessel, *l*, provided with proper man-holes or doors, through which to insert wood and withdraw pulp, and into this vessel or case steam is to be admitted through a pipe, *m*. In either of these cases the steam, to the action of which the wood is subjected during the grinding, softens the fiber of the wood and facilitates the grinding.

I claim as of my own invention—

The herein-described improvement in the art of reducing wood to pulp, which consists in subjecting the wood, substantially in the manner herein described, to the action of steam while the wood is being ground.

HARRISON B. MEECH.

Witnesses:

ALEX. PORTER BROWNE,

J. HENRY TAYLOR.